Nov. 15, 1960  E. E. JUDGE, SR  2,959,841
SHAFT BURNISHING MACHINE
Filed Oct. 11, 1957  2 Sheets-Sheet 1

INVENTOR.
EDWARD E. JUDGE SR.
BY
ATTORNEYS

Nov. 15, 1960 — E. E. JUDGE, SR — 2,959,841
SHAFT BURNISHING MACHINE
Filed Oct. 11, 1957 — 2 Sheets-Sheet 2
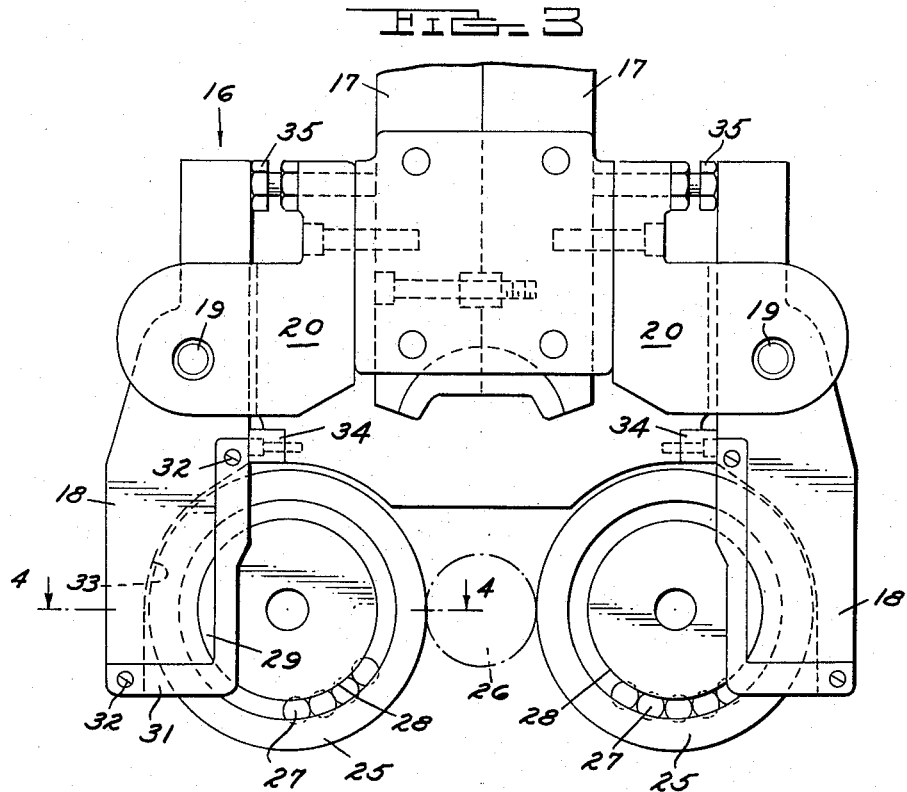
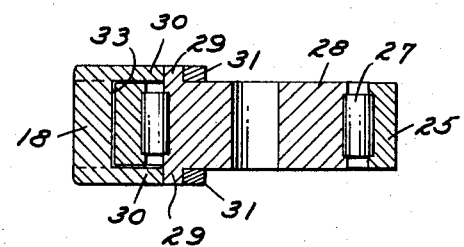
INVENTOR.
EDWARD E. JUDGE SR.
BY
ATTORNEYS United States Patent Office 2,959,841
Patented Nov. 15, 1960

2,959,841

SHAFT BURNISHING MACHINE

Edward E. Judge, Sr., Lansing, Mich., assignor to Industrial Metal Products Corp'n, Lansing, Mich., a corporation of Michigan Filed Oct. 11, 1957, Ser. No. 689,508

5 Claims. (Cl. 29—90)

This invention pertains to a burnishing machine in which a plurality and preferably two opposed burnishing rolls are urged under high force against a rotating workpiece shaft so that the outer surface of the shaft is rolled smooth and hard to an accurate finished dimension. This operation not only produces a high finish on the shaft suitable for bearing surfaces but through healing minute surface fractures and placing the outer fibers under compressive stress, substantially increases the shaft's strength and fatigue resistance.

In the past, burnishing operations have not been feasible for complicated workpieces such as crankshaft bearings due to the difficulty of applying adequate burnishing pressure loads within the space limitations imposed by adjacent protruding flanges and without undue deflection of the crankshaft. The present solution to this problem makes possible production burnishing of all main and pin bearings (including corner fillets) between immediately adjacent vertical flange side walls of a crankshaft without imposing deflection loads on the crankshaft during the operation.

A preferred embodiment of this invention incorporates two opposed large diameter burnishing rolls mounted with roller bearings on large diameter but short bearing shafts generally co-extensive with the width of the burnishing rolls. A limited sector along the periphery of each bearing shaft extends beyond the width of the burnishing roll for rigid attachment to a lever arm by a shaft retainer. The two opposed lever arms are connected at opposite outer radial extremities of the respective burnishing roll bearing shafts leaving the inner portions of the rolls extending toward each other so that they may contact and burnish work shaft surfaces which have flanges or projections extending outwardly at either or both ends. In this manner, the rolls are free to rotate about a bearing shaft held rigidly at an outer extremity, instead of centrally, so that more than half of the roll and its bearing shaft are free for insertion between any projections adjacent a surface to be burnished.

Each lever arm is pivoted to a common reaction frame which is movable into operating position with the burnishing rolls engaging diametrically opposed portions of the work shaft to be burnished. Lever arm stops are provided on the common frame which may be adjusted so that the rolls are separated by a distance slightly less than the finished diameter of the work shaft to be burnished. The lever arms are employed as elastic members for exerting large forces against the work shaft to be burnished, e.g. in the order of 8,000 lbs., in the case of a passenger car engine crankshaft. While high unit pressures result, the large diameter of the burnishing rolls prevents flaking or fracturing of the work shaft. It is, of course, within the scope of this invention to fix one of the rolls and attach the other to a pivoted lever arm or to have a larger number of rolls with one or more being attached to lever arms to provide the high burnishing forces.

It is, therefore, an object of this invention to provide a shaft burnishing assembly capable of exerting very high forces through large diameter burnishing rolls.

Another object is to provide a burnishing assembly which utilizes the elasticity of relatively strong rigid holding members to supply large resilient burnishing forces.

It is a further object to pivot holding arms to a common reaction frame so that the holding arms are forced about the pivot against reaction limit stops.

It is another object to connect each holding arm to a burnishing roll so that a large portion of such roll is free to engage a recessed work shaft surface.

Another object is to provide an anti-friction mounting for said roll such that more than half of the burnishing roll is available, without axial projections wider than the burnishing roll, for insertion onto a recessed work shaft surface such as the pin bearing of a crankshaft.

Another object is to adapt such burnishing assembly to the simultaneous burnishing of multiple offset crankshaft bearings.

These and other objects will become more apparent when a preferred embodiment of this invention is described in detail in connection with the drawings, in which:

Figure 3 is an enlarged view of the burnishing head shown in Figure 2; and

Figure 4 is a section taken at 4—4 of Figure 3 showing the attachment between the lever arm and the roll bearing shaft.

Figure 1:
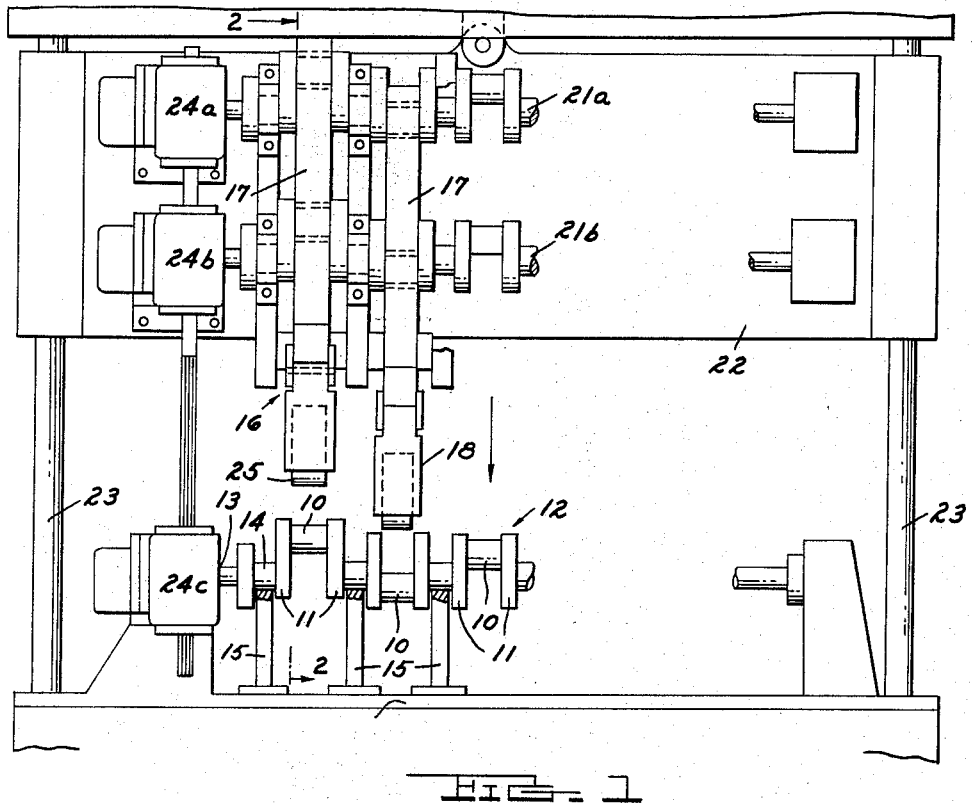
Figure 1 is a partial elevational view of a burnishing machine incorporating a series of burnishing rolls of this invention which are adapted to burnish simultaneously a plurality of offset bearings on a motor vehicle crankshaft.

Two burnishing units are shown in Figure 1 with similar additional units omitted since their structure and operation are similar. Due to the compact nature of the burnishing units shown in Figure 1, all of the offset pin bearings of a crankshaft may be burnished simultaneously. Each pin bearing 10 is recessed between counterweights 11 of workpiece crankshaft 12 which is turned by chuck 13, the pin bearings being eccentric to the axis of rotation of crankshaft 12. Main bearings 14 are concentric with the axis of rotation of the crankshaft 12 and are supported against vertically downward thrust by segmental stationary bearings 15.

Figure 2:
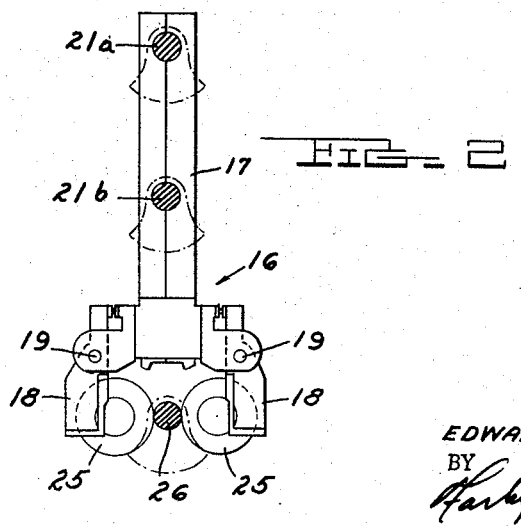
Figure 2 is a section taken at 2—2 of Figure 1 showing a working position of one burnishing unit when lowered into contact with a pin bearing of the crankshaft.

Each burnishing unit 16 has supporting structure including a pair of members 17 and two tensioning arms 18 which are pivoted with large dowel pins at 19 to pivot support yokes 20 attached to the lower ends of the members 17, as best shown in Figures 2 and 3. The members 17 are driven by two synchronized master crankshafts 21a and 21b mounted on a frame 22 which may be raised and lowered on corner guide posts 23 relative to workpiece crankshaft 12, the master and workpiece crankshafts being synchronously driven by interlocked drive units 24a, 24b and 24c. In this manner, as the workpiece crankshaft 12 is rotated, each burnishing unit will move in an eccentric path corresponding to one of the workpiece pin bearings, and when the frame 22 is lowered into operating position, the burnishing rolls 25 of each burnishing unit will become aligned with the pin bearing surface 26 to be burnished.

The preferred detailed construction of the burnishing unit 16 may be more clearly seen in Figures 3 and 4. Burnishing rolls 25 are fitted on roller bearings 27 which are in turn fitted on short bearing shafts 28. Shaft extensions 29 are rigidly seated on the lower ends 30 of tensioning arms 18 and held in assembled position by retainers 31 bolted at 32 to the tensioning arms. As shown at 33, the lower ends of the arms 18 are recessed to accommodate free rotation of the burnishing rolls 25 on their roller bearings 27.

Stops 34 seated at the lower ends of the yokes 20 limit the inward travel of the tensioning arms 18 and rolls 25 to a minimum setting slightly smaller than the workpiece shaft diameter, and the arms 18 may be pre-loaded against stops 34 by adjustable reaction stops 35, the positioning of which determines the magnitude of pressure loading of the burnishing rolls 25 against the workpiece shaft in operation. By employing a suitable heavy construction for the tensioning arms 18, small deflections (e.g. in the order of .020 of an inch) are sufficient to exert a large order of burnishing roll forces (e.g., 8000 lbs.) against the workpiece shaft.

It will be noted that such forces are balanced and reactively self-contained within the head of the burnishing unit and result in no bending load on the workpiece.

It will also be seen that in excess of 50% of the burnishing roll diameter may be inserted without interference between protruding flanges on either side of the burnishing area due to the unique means off center mounting of the burnishing roll bearing shaft.

The relatively large diameter rolls used in this embodiment prevent flaking or fracturing of the workpiece surface while effecting a reduction in the diameter of the workpiece shaft which may be in the order of .0002 of an inch. Crankshaft burnishing speeds in the order of 240 r.p.m. have proved satisfactory. Such burnishing has been found to strengthen and increase the capacity of crankshafts in the order of 15% to 20%, allowing for crankshaft usage in higher horsepower engines.

It would, of course, be possible to fix one of the shafts 28 while the other is mounted on a tensioning arm as shown. If desired, three or more burnishing rolls may be used with one or more mounted on a tensioning arm to provide the large burnishing forces.

While a particular preferred embodiment has been disclosed and described above in detail it will be understood that numerous modifications may be resorted to without departing from the scope of my invention as defined in the following claims.

I claim:

1. A burnishing unit for a burnishing machine comprising supporting structure, a burnishing roll, means rotatably mounting said burnishing roll on said structure, said roll mounting means including a shaft defining the axis of rotation of said roll, and means engaging only a fractional off-center portion of the ends of said shaft securing said shaft to said structure.

2. A burnishing unit as set forth in claim 1 further characterized by said roll mounting means including an arm carried by said supporting structure, a recess formed in said arm receiving a portion of said roll, a second recess formed in said arm receiving a segment of said shaft, and means carried by said arm securing said shaft segment in said second recess.

3. A burnishing unit for a burnishing machine comprising supporting structure, a pair of tensioning arms mounted on said structure in opposed spaced relation, means rotatably mounting a burnishing roll on each of said arms, said roll mounting means including a shaft defining the axis of rotation of said roll, and means engaging only a fractional off-center portion of the ends of said shaft securing said shaft to its arm outwardly of the axis of said roll whereby each of said rolls projects inwardly of its arm a distance greater than its radius.

4. A burnishing unit according to claim 3 further characterized by said roll mounting means including a recess formed in said arm to rotatably receive the roll carried thereby, said shaft being provided with a segmented projection to either side of said roll in off-center relation to the axis thereof, and means securing said projection to said arm.

5. A burnishing unit according to claim 3 further characterized by at least one of said arms being pivotally mounted on said supporting structure with stop means carried by said supporting structure limiting movement of the pivotally mounted arm toward the other arm, and means interposed between the pivotally mounted arm and said supporting structure for fixedly positioning such arm in contact with said stop means with a desired amount of preload force whereby the burnishing pressure exerted by said rolls is a function of the force required to deflect said arms.

References Cited in the file of this patent

UNITED STATES PATENTS

| Number | Name | Date |
|---|---|---|
| 199,592 | Stever | Jan. 22, 1878 |
| 408,521 | Quackenbush | Aug. 6, 1889 |
| 1,370,715 | Teas | Mar. 8, 1921 |
| 1,429,720 | Nisson | Sept. 19, 1922 |
| 1,436,210 | Strong | Nov. 21, 1922 |
| 1,748,285 | Cough | Feb. 25, 1930 |
| 1,919,152 | Wilkins | July 18, 1933 |
| 2,053,009 | Schmidt | Sept. 1, 1936 |
| 2,065,221 | Hellyar | Dec. 22, 1936 |
| 2,114,978 | Horger | Apr. 19, 1938 |
| 2,294,685 | Nelson | Sept. 1, 1942 |
| 2,357,515 | Jackman | Sept. 5, 1944 |
| 2,522,084 | Baruch | Sept. 12, 1950 |
| 2,559,360 | Kuzweil | July 3, 1951 |
| 2,734,255 | Tack | Feb. 14, 1956 |